(12) United States Patent
Kamishima

(10) Patent No.: US 9,379,564 B2
(45) Date of Patent: Jun. 28, 2016

(54) CHARGING CONTROL APPARATUS AND CHARGING CONTROL METHOD

(75) Inventor: Utaka Kamishima, Machida (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 809 days.

(21) Appl. No.: 13/702,840

(22) PCT Filed: Jun. 9, 2011

(86) PCT No.: PCT/JP2011/003261
§ 371 (c)(1),
(2), (4) Date: Dec. 7, 2012

(87) PCT Pub. No.: WO2011/155207
PCT Pub. Date: Dec. 15, 2011

(65) Prior Publication Data
US 2013/0088200 A1   Apr. 11, 2013

(30) Foreign Application Priority Data

Jun. 9, 2010 (JP) ................................. 2010-131981
Apr. 19, 2011 (JP) ................................. 2011-092807

(51) Int. Cl.
| | |
|---|---|
| H02J 7/00 | (2006.01) |
| B60L 3/04 | (2006.01) |
| B60L 11/14 | (2006.01) |
| B60L 11/18 | (2006.01) |
| H01M 10/44 | (2006.01) |

(52) U.S. Cl.
CPC ................. *H02J 7/0052* (2013.01); *B60L 3/04* (2013.01); *B60L 11/14* (2013.01); *B60L 11/1816* (2013.01); *B60L 11/1846* (2013.01); *H01M 10/44* (2013.01); *Y02T 10/70* (2013.01); *Y02T 10/7005* (2013.01); *Y02T 10/7072* (2013.01); *Y02T 10/7077* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ........................................................ 320/109
See application file for complete search history.

(56) References Cited

U.S. PATENT DOCUMENTS

| | | | |
|---|---|---|---|
| 8,600,593 B2 | 12/2013 | Ohno | |
| 2010/0079105 A1* | 4/2010 | Iwanaga | B60K 6/445 320/109 |

FOREIGN PATENT DOCUMENTS

| | | |
|---|---|---|
| CN | 2319946 Y | 5/1999 |
| JP | 10-262340 A | 9/1998 |

(Continued)

*Primary Examiner* — Robert Grant
(74) *Attorney, Agent, or Firm* — Foley & Lardner LLP

(57) ABSTRACT

A charging control method for controlling a charge operation to a storage unit E2 of a vehicle, using a charging cable CC that is connected to a charging inlet E1 of the vehicle and supplies power to the storage unit E2 from an external power supply BP provided outside the vehicle, the method has detecting connection of the charging cable CC to the charging inlet E1, detecting a command signal of a disconnection command unit C22 of the charging cable CC, pausing the charge operation to the storage unit E2 while maintaining a closed state of relay switches C42, E5, E6 of a vehicle side power supply line for only a predetermined time when detecting the command signal of the disconnection command unit C22 which indicates the disconnection in a state where the charging cable CC is connected to the charging inlet E1, and restarting the charge operation to the storage unit E2 when detecting a command signal of the disconnection command unit C22 which indicates cancel of the disconnection during the predetermined time.

7 Claims, 3 Drawing Sheets

(56) References Cited

FOREIGN PATENT DOCUMENTS

| JP | 2009-071900 A | 4/2009 |
| JP | 2010-081740 A | 4/2010 |
| WO | WO 2009/004920 A1 | 1/2009 |

* cited by examiner

CHARGING CONTROL APPARATUS AND CHARGING CONTROL METHOD

TECHNICAL FIELD

The present invention relates to a charging control apparatus and a charging control method.

BACKGROUND ART

As a related art control system for charging a drive battery unit for a hybrid vehicle, it is disclosed in, for example, Japanese Patent Provisional Publication No. 2010-81740 (hereinafter is referred to as JP2010-81740). In the control system in JP2010-81740, a resistance element is provided on an extending signal line that extends from a pilot signal line, and it is proposed to judge whether a connector of a charging cable is actually disconnected from a charging inlet of the vehicle or an operation button for releasing the connector of the charging cable from a mechanical lock between the charging inlet and the connector is merely pressed, on the basis of a change of a signal level inputted through the extending signal line.

CITATION LIST

Patent Literature

Japanese Patent Provisional Publication No. 2010-81740

SUMMARY OF THE INVENTION

In the above vehicle charging system, however, when an operation unit (the operation button for releasing the connector of the charging cable) of an attachment is pressed in a state where the connector of the charging cable is fitted and inserted into the charging inlet of the vehicle, even if this pressing operation is not operation by driver's intention (namely that even if the driver presses the operation button by mistake), a system main relay is opened (i.e. switched off) and the charging system is shut off. Because of this, the system main relay is required to be closed (i.e. switched on) again for restart, and this shortens lifetime of the relay switch.

It is therefore an object of the present invention to provide a charging control apparatus and a method for controlling the charge, which are capable of suppressing reduction in lifetime of a relay switch in the charging system.

According to one aspect of the present invention, a charging control apparatus that controls a charge operation, using a charging cable that is connected to a charging inlet of a vehicle and supplies power to a storage unit of the vehicle from an external power supply provided outside the vehicle, comprises: a connection state detection section that detects connection of the charging cable to the charging inlet; a disconnection detection section that detects a command signal of a disconnection command unit of the charging cable; and a control unit that, when detecting the command signal of the disconnection command unit which indicates the disconnection in a state where the charging cable is connected to the charging inlet, pauses the charge operation to the storage unit while maintaining a closed state of at least a relay switch of a charging cable side power supply line for only a predetermined time.

According to another aspect of the present invention, a charging control method for controlling a charge operation to a storage unit of a vehicle, using a charging cable that is connected to a charging inlet of the vehicle and supplies power to the storage unit from an external power supply provided outside the vehicle, comprises: detecting connection of the charging cable to the charging inlet; detecting a command signal of a disconnection command unit of the charging cable; pausing the charge operation to the storage unit while maintaining a closed state of at least a relay switch of a charging cable side power supply line for only a predetermined time, when detecting the command signal of the disconnection command unit which indicates the disconnection in a state where the charging cable is connected to the charging inlet; and restarting the charge operation to the storage unit when detecting a command signal of the disconnection command unit which indicates cancel of the disconnection during the predetermined time.

Advantageous Effects Of Invention

According to the present invention, in the state where the charging cable is connected to the charging inlet of the vehicle, when obtaining or detecting the command that indicates disconnection of the charging cable, the closed state of the relay switch is maintained for only the predetermined time. Therefore, in the case where the command of disconnection of the charging cable, which is not driver's intention, is issued, by issuing a command that cancels the disconnection, the charging can be restarted without taking switching action (ON/OFF action) of the relay switch. With this, the number of switching actions of the relay switch is decreased, and reduction in lifetime of the relay switch can be suppressed.

DESCRIPTION OF EMBODIMENTS

In the following description, an example in which a charging control apparatus of an embodiment of the present invention is used in a charging system for an electric vehicle will be explained.

Figure 1:
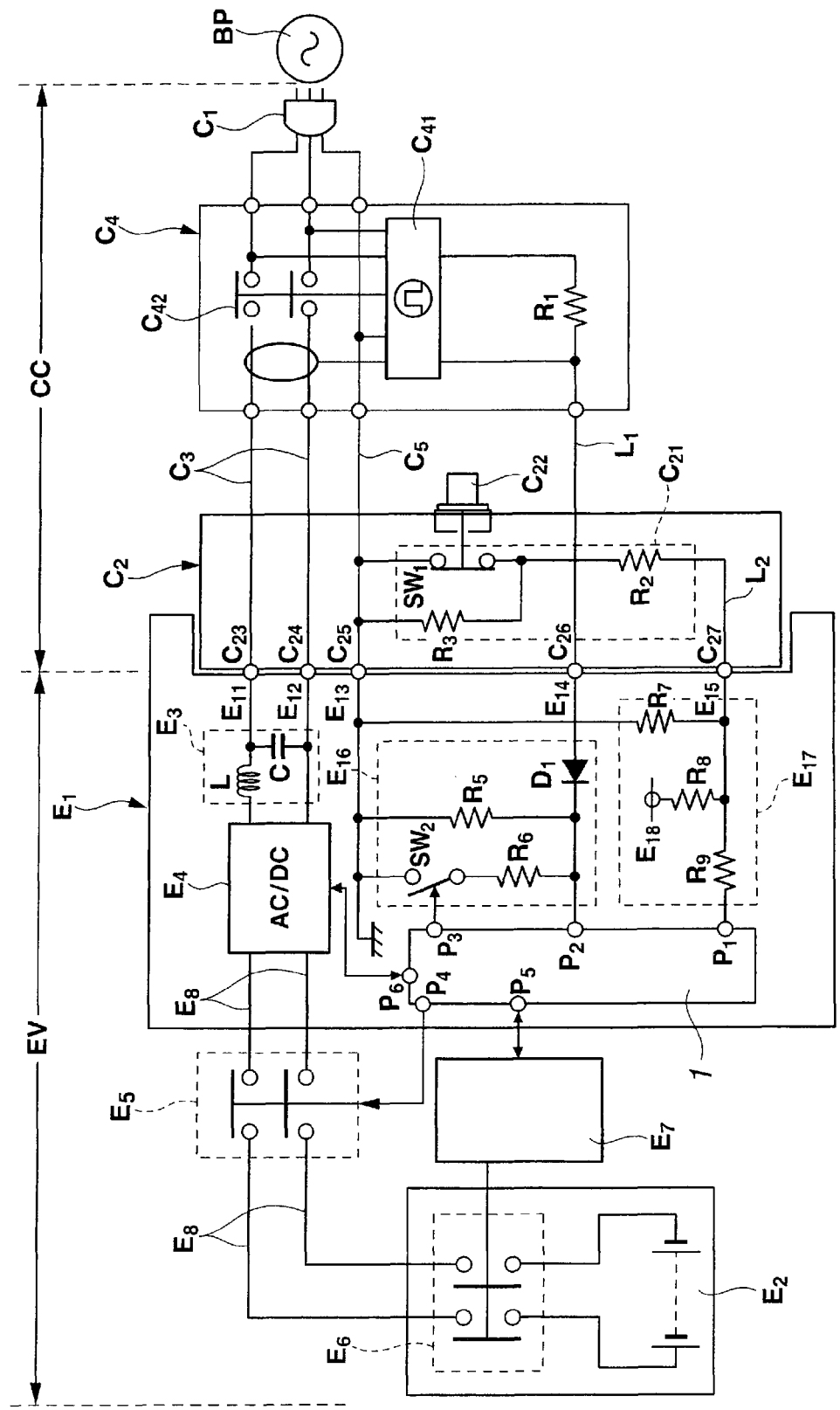
FIG. 1 is an electric circuit diagram showing a charging system that employs an embodiment of the present invention.

FIG. 1 shows an example of the system that charges a battery E2 of a secondary battery mounted in an electric vehicle EV by connecting a first connector C1 of a charging cable CC to an external power supply BP provided outside the vehicle and connecting a second connector C2 of the charging cable CC to a charging inlet E1 of the electric vehicle EV.

In FIG. 1, although a charging control apparatus 1 is employed in the electric vehicle EV, it is not limited to the electric vehicle EV. The charging control apparatus 1 could be employed in a hybrid vehicle in which an internal combustion engine and an electric motor for generating power to drive the vehicle are mounted. The battery E2 supplies power to the electric motor (not shown) and on-vehicle equipment (not shown).

One end of a power line C3 of the charging cable CC is provided with the first connector C1 that connects to the external power supply BP such as an electric outlet of a commercial power supply provided in a house. The other end of the power line C3 is provided with the second connector C2 that connects to the charging inlet E1 of the electric vehicle EV.

Further, the charging cable CC is provided with a control unit C4. The control unit C4 has a signal generating section C41 and a relay switch C42. The signal generating section C41 generates a pulse signal that corresponds to a rated current feedable to the electric vehicle EV through the power line C3. The relay switch C42 interrupts the power line C3 with the aim of preventing fault current.

The signal generating section C41 has CPU, ROM and RAM that operate by power supplied from the external power supply BP and has an oscillator that generates the pulse signal. The pulse signal generated in the signal generating section C41 is outputted to an input port P2 of the charging control apparatus 1 through a resistance element R1, a control signal line L1 and an interface circuit E16.

The second connector C2 is provided with a connection judging circuit C21. The connection judging circuit C21 has a switch SW1 whose one end is connected to a ground wire C5, a resistance element R2 that is connected to the switch SW1 in series and a resistance element R3 that is connected to the switch SW1 parallel to the switch SW1. An output signal of this connection judging circuit C21 is inputted, as a connection detection signal that indicates whether the charging cable CC is connected to the charging inlet E1, to an input port P1 of the charging control apparatus 1.

The second connector C2 is provided with a mechanical lock system (not shown) in order that the second connector C2 inserted into the charging inlet E1 is not disconnected from the charging inlet E1, also is provided with an operation button C22 for releasing the lock system. When an operator such as a driver presses the operation button C22 to disconnect the second connector C2 of the charging cable CC from the charging inlet E1, the lock system is released by this pressing operation, and the disconnection of the second connector C2 is made. The operation button C22 and the switch SW1 are configured to work in conjunction with each other. When the operation button C22 is pressed, the switch SW1 of the connection judging circuit C21 is brought to an open state (OFF) by and in response to this pressing operation of the operation button C22. When releasing the pressing operation, the switch SW1 is returned to a closed state (ON).

Here, since the lock system, the operation button C22 and the switch SW1 work in conjunction with each other, even if the operator does not press the operation button C22 when fitting and inserting the second connector C2 of the charging cable CC into the charging inlet E1, the operation button C22 is pressed for a moment by the fit between the second connector C2 and the charging inlet E1 by the lock system and the switch SW1 also shifts to OFF state for a moment.

The second connector C2 of the charging cable CC is provided with a pair of power terminals C23 and C24 that connect to the power line C3, a ground terminal C25 that connects to the ground wire C5, a signal terminal C26 that connects to the control signal line L1 outputting the pulse signal, and a signal terminal C27 that connects to an output signal line L2 of the connection judging circuit C21.

The charging inlet E1 is provided with a plurality of terminals E11-E15 that are connected to the terminals C23-C27 of the second connector C2 respectively.

Further, the charging inlet E1 has the charging control apparatus 1. The charging control apparatus 1 has ROM storing a control program, RAM used as a working area, and nonvolatile memory saving control data upon the power-off.

The charging inlet E1 is provided, as peripheral circuits of the charging control apparatus 1, with the interface circuit E16 and a connection state determining circuit E17. The interface circuit E16 detects a signal level of the pulse signal inputted to the charging inlet E1, also changes the signal level in two levels. The connection state determining circuit E17 is connected to an output terminal of the connection judging circuit C21.

The interface circuit E16 has a diode D1, resistance elements R5 and R6 that lower the signal level of the pulse signal inputted through the diode D1, and a switch SW2.

The switch SW2 is formed by a transistor element etc., and performs ON/OFF operation by a command signal from an output port P3 of the charging control apparatus 1. The charging control apparatus 1 outputs the command signal that closes the switch SW2 from the output port P3 when the connection state determining circuit E17 determines that the first connector C1 is connected to the external power supply BP and also the second connector C2 is connected to the charging inlet E1.

The connection state determining circuit E17 is formed by a resistance voltage dividing circuit having resistance elements R7, R8 and R9. The resistance element R7 is connected to the connection judging circuit C21 parallel to the connection judging circuit C21 between the signal terminal C27 of the connection judging circuit C21 and the ground wire C5. The resistance element R8 is connected to this parallel circuit in series, and one end of the resistance element R8 is connected to a power supply E18 (e.g. DC 5V).

Operation of the interface circuit E16 and the connection state determining circuit E17 will be described later.

The charging inlet E1 is configured so that after high voltage power supplied from the power line C3 of the charging cable CC which connects to the charging inlet E1 is converted to DC power by an AC/DC converter E4 through an LC filter E3 having a coil L and a capacitor C, the DC power is fed to the battery E2 of a high voltage battery unit.

On a power line E8 between the AC/DC converter E4 and the battery E2, a relay switch E5 that performs ON/OFF operation by a command signal outputted from an output port P4 of the charging control apparatus 1 and a relay switch E6 that performs ON/OFF operation by a command signal (a command signal based on a command signal outputted from an input/output terminal port P5 of the charging control apparatus 1) from a vehicle controller E7 are provided. The relay switch E5 is termed also a charging relay switch. The relay switch E6 is termed also a main relay switch.

The AC/DC converter E4 outputs a detection signal that indicates whether the high voltage power is supplied to the AC/DC converter to an input port P6 of the charging control apparatus 1.

The charging control apparatus 1 controls the AC/DC converter E4, and performs a start of conversion operation from AC power supplied by the charging cable CC to DC power, also performs a pause and a stop of the conversion operation. With this control, each operation of a start of charge to the battery E2, a pause and a stop of charge to the battery E2, is carried out.

Next, a control procedure of the charging control apparatus 1 when charging the battery E2 by the charging cable CC will be explained with reference to a flow chart in FIG. 2 and timing charts in FIG. 3.

Figure 3:
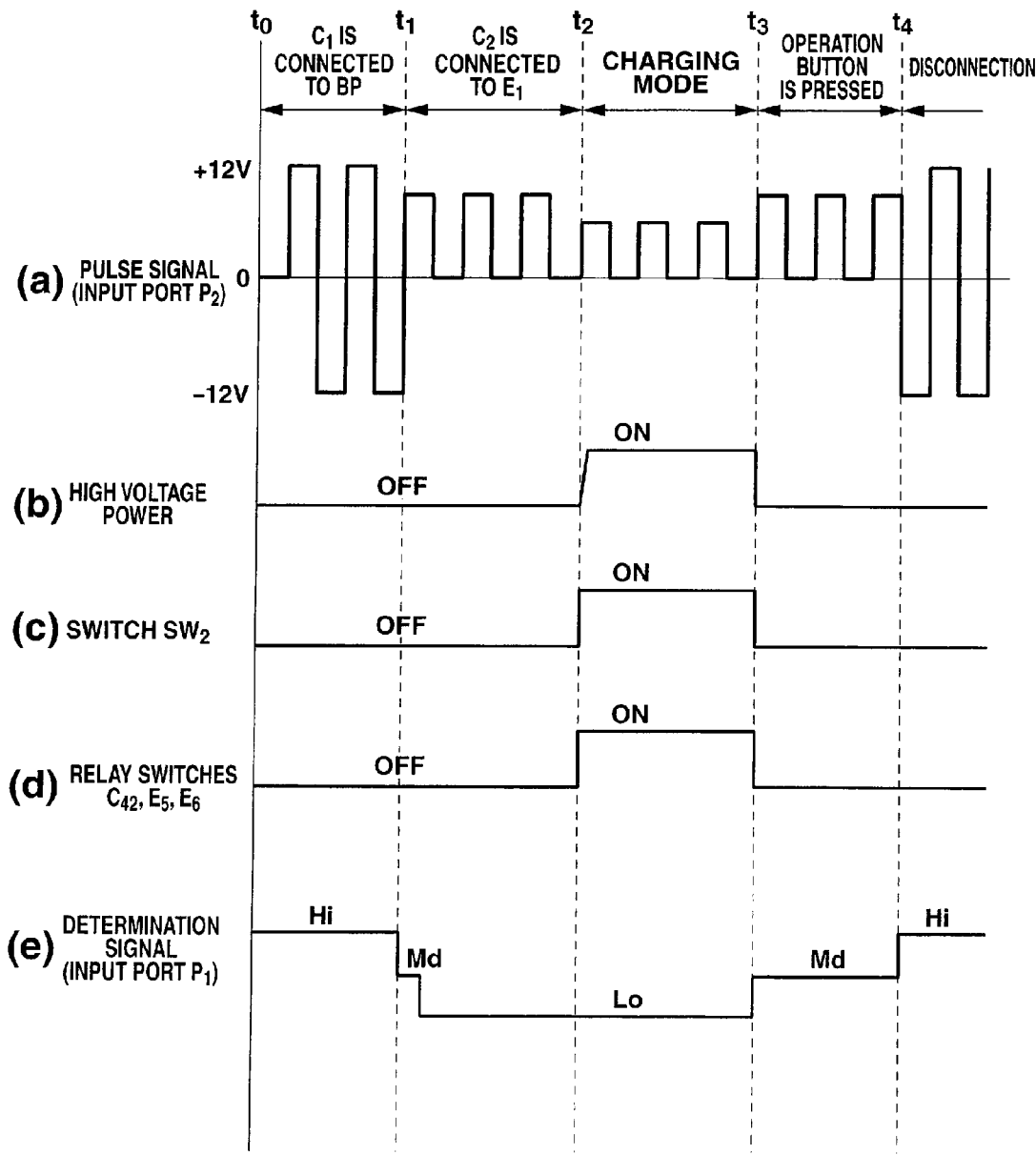
FIG. 3 is timing charts in the charging control of FIG. 2.

In FIG. 3, when the charging control apparatus 1 is in a standby state, at time t0, the first connector C1 of the charging cable CC is connected to an electric outlet of the external power supply BP. Subsequently, at time t1, the second connector C2 of the charging cable CC is connected to the charging inlet E1.

When the first connector C1 of the charging cable CC is connected to the electric outlet of the external power supply BP at time t0, since current flows in the signal generating section C41 shown in FIG. 1, the pulse signal having a predetermined level (e.g. ±12V), a predetermined duty cycle and a predetermined frequency (e.g. 1 kHz) is outputted from the signal generating section C41 (see time chart (a) of the pulse signal between time t0 and time t1 in FIG. 3). FIG. 3 (a) shows the pulse signal inputted to the input port P2 of the charging control apparatus 1. Here, since the second connector C2 and the charging inlet E1 are not connected between time t0 and t1, in actual fact the pulse signal inputted to the input port P2 is zero. However, for the sake of convenience, FIG. 3 (a) shows the pulse signal outputted from the signal generating section C41.

Since the second connector C2 is not connected to the charging inlet E1 for this time t0~t1, the AC/DC converter E4 is not supplied with the high voltage power (see time chart (b) of the high voltage power between time t0 and time t1 in FIG. 3). Further, since the second connector C2 is not connected to the charging inlet E1 for this time t0~t1, a signal level of a determination signal inputted to the input port P1 from the connection state determining circuit E11 is a high level Hi (a first level) that is determined by the power supply E18 and the resistance elements R7, R8 and R9 (see time chart (e) of the determination signal in FIG. 3). Therefore, the switch SW2 of the interface circuit E16 is in the open state (OFF) (see time chart (c) of the switch SW2 between time t0 and time t1 in FIG. 3). Likewise, each of the relay switches C42, E5 and E6 is also in the open state (OFF) (see time chart (d) of the relay switch between time t0 and time t1 in FIG. 3).

Here, the duty cycle of the pulse signal generated in the signal generating section C41 is a value that is set on the basis of current-carrying capacity feedable to the electric vehicle EV from the external power supply BP through the charging cable CC, and it is set for each charging cable CC. For example, in a case where the current-carrying capacity is 12A, the duty cycle is 20%. In a case where the current-carrying capacity is 24A, the duty cycle is 40%.

When the second connector C2 is connected to the charging inlet E1 at time t1 in FIG. 3, since the connection judging circuit C21 and the connection state determining circuit E17 are connected through the output signal line L2, the signal level of the determination signal inputted to the input port P1 of the charging control apparatus 1 shifts to a low level Lo (a second level) by a resistance voltage dividing circuit formed by adding the resistance element R2 to the power supply E18 and the resistance elements R7, R8 and R9. The charging control apparatus 1 judges that the second connector C2 is connected to the charging inlet E1 by detecting the determination signal of the Lo level, and the routine proceeds from step S1 to step S2 in the flow chart in FIG. 2.

Here, at the instant when the second connector C2 is connected to the charging inlet E1 (i.e. in the instant after the time t1 or just after the time t1), the lock system of the second connector C2 momentarily opens and closes, and the switch SW1 is momentarily brought to the open state (OFF) in response to this instantaneous open of the lock system. Thus, the signal level of the determination signal inputted to the input port P1 momentarily shifts to a middle level Md by a resistance voltage dividing circuit formed by adding the resistance elements R2 and R3 to the power supply E18 and the resistance elements R7, R8 and R9. However, in the present embodiment, the shift to this middle level Md is disregarded.

In the following description, the determination signal at time t1 is the one that indicates the low level Lo except the instant after the time t1.

At time t1 in FIG. 3, the pulse signal generated in the signal generating section C41 is inputted to the input port P2 of the charging control apparatus 1 through the control signal line L1. At this time, the pulse signal is inputted as a pulse signal of a predetermined level which depends on the resistance element R5 of the interface circuit E16. For instance, as shown by the time chart (a) of the pulse signal between time t1 and time t2 in FIG. 3, the pulse signal becomes a pulse signal having +9V.

When the charging control apparatus 1 detects the pulse signal of +9V inputted to the input port P2, the routine proceeds from step S2 to step S3. Further, after a lapse of a predetermined time X, the routine proceed to step S4.

Figure 2:
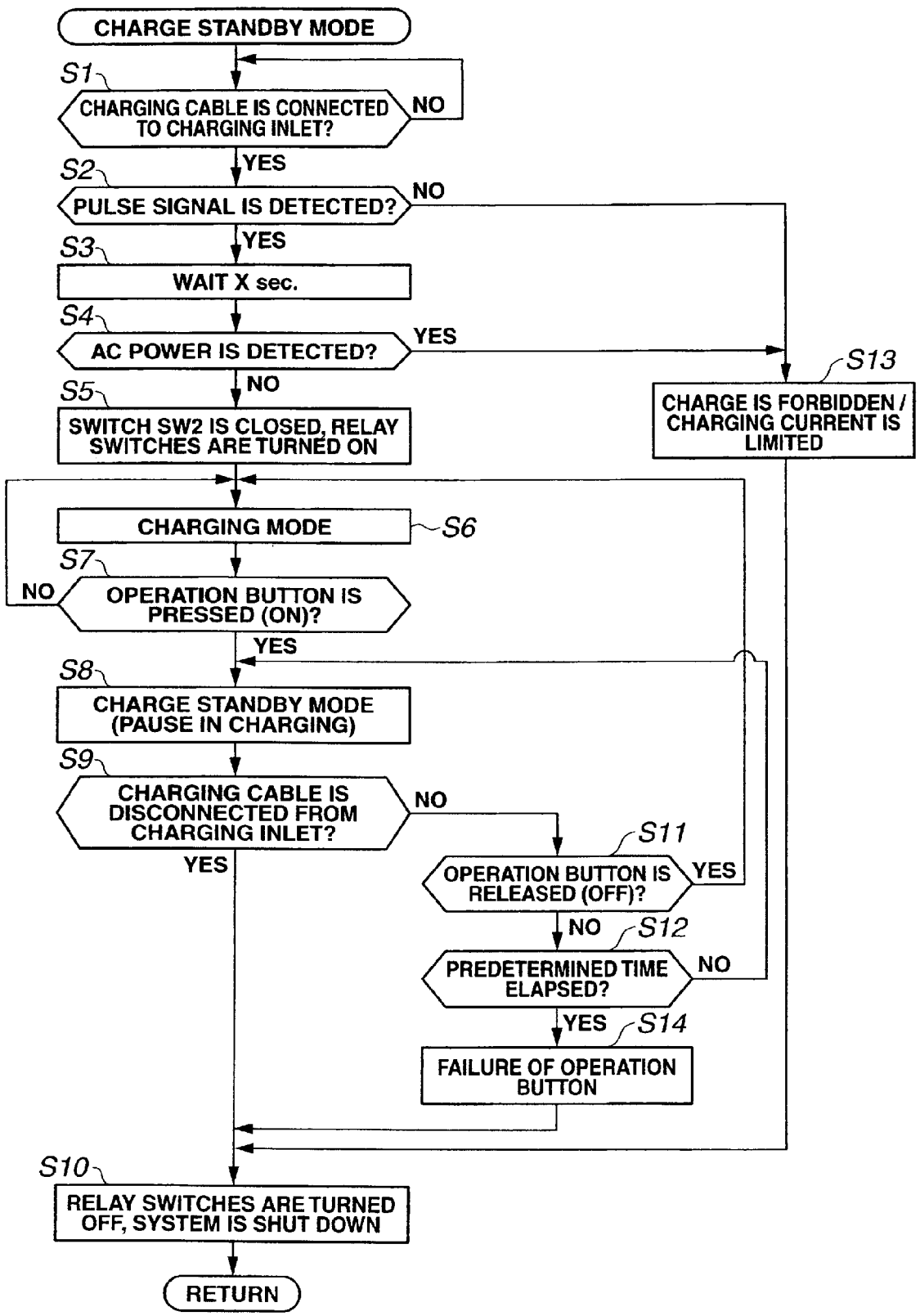
FIG. 2 is a flow chart showing a procedure of a discharging control of a charging control apparatus of FIG. 1.

At step S4 in FIG. 2, when the charging control apparatus 1 detects that the AC/DC converter E4 is supplied with no power, the routine proceeds to step S5, and the charging control apparatus 1 outputs the ON command signal (switch-ON command signal or switch-closing command signal) of the switch SW2 from the output port P3.

When the switch SW2 shifts to the closed state (ON), the pulse signal inputted to the input port P2 of the charging control apparatus 1 from the signal generating section C41 through the control signal line L1 lowers by a voltage dividing circuit of the resistance elements R5 and R6. Then as shown by the time chart (a) of the pulse signal after time t2 in FIG. 3, the pulse signal changes to a pulse signal of, for instance, +6V. When the charging control apparatus 1 detects this change of the pulse signal, the charging control apparatus 1 outputs a command signal that closes the relay switch C42 of the control unit C4 to the control unit C4. Simultaneously, the charging control apparatus 1 outputs the command signal that closes the relay switch E5 to the relay switch E5, also outputs the command signal that closes the relay switch E6 to the vehicle controller E7. By these ON operations of the relay switches C42, E5 and E6, a charging mode starts (at step S6 in FIG. 2), and by controlling the AC/DC converter E4, the power from the external power supply BP is supplied to the battery E2 through the power line C3 of the charging cable CC (time t2~t3 in FIG. 3).

Figure 4:
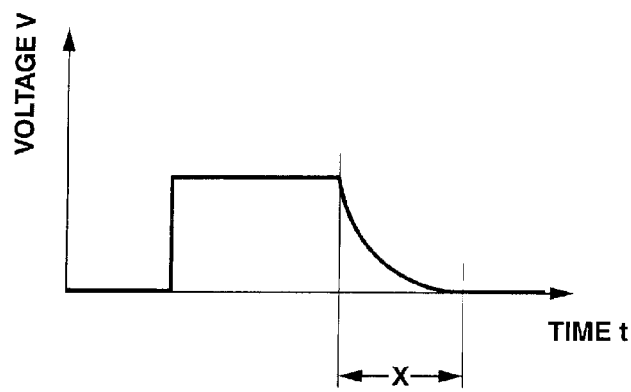
FIG. 4 is a characteristic diagram of residual voltage by a noise-absorbing capacitor.

Here, in FIG. 2, the reason why after a lapse of the predetermined time X at step S3, the power of the AC/DC converter E4 is detected is because there is a risk that if charge is accumulated in the capacitor C of the LC filter E3, the detection will not correctly be made due to the influence of residual voltage shown in FIG. 4. That is, since it takes the time X for the capacitor C to discharge the charge after the power supply to the AC/DC converter E4 is shut off, the power is detected after the time X elapses, thereby preventing the misdetection.

In FIG. 2, in a case where, at step S2, the pulse signal of the predetermined level is not detected at the input port P2 of the charging control apparatus 1 despite the fact that the first connector C1 of the charging cable CC is connected to the external power supply BP and the second connector C2 is connected to the charging inlet E1, and in a case where, at step S4, the power supplied to the AC/DC converter E4 is not zero, it is judged that the charging cable CC is a cable that does not conform to the SAE standards (Society of Automotive Engineers Standards), or it is judged that the first connector C1 of the charging cable CC is disconnected from the electric outlet of the external power supply BP or the control signal line L1 is broken or in a defective condition, or it is judged that a weld failure occurs in the relay switch C42 or a failure occurs in the switch SW2 of the charging inlet E1, namely that it is judged that some problems arises, then the routine proceeds to step S13. At step S13, a command signal for forbidding the charge or limiting the charging current is outputted to the AC/DC converter E4.

Next, when the operation button C22 of the second connector C2 is pressed in a state of the charging mode of step S6 (at step S7 in FIG. 2, at time t3 in FIG. 3), the routine proceeds to step S8, and the mode shifts to a charge standby mode. In this charge standby mode, since the operation button C22 is pressed (the button is switched ON or pushed ON), the switch SW1 of the connection judging circuit C21 is brought to the open state (OFF). With this, the signal level of the determination signal inputted to the input port P1 of the charging control apparatus 1 rises from the Lo level by a voltage corresponding to the resistance element R3 of the connection judging circuit C21 and shifts to the Md level (a third level). That is, the signal level of the determination signal inputted to the input port P1 shifts to the middle level Md by a resistance voltage dividing circuit formed by the resistance elements R7 and R8 of the parallel connection and the resistance elements R2 and R3 connected in series, with respect to the power supply E18.

When the charging control apparatus 1 detects this rise of the voltage level of the de-termination signal inputted to the input port P1, the charging control apparatus 1 outputs a command signal that pauses (or temporarily halts) the charging operation to the AC/DC converter E4 while maintaining the relay switches C42, E5 and E6 in the closed state (ON).

Subsequently, at step S9, a detection is made as to whether or not the second connector C2 is disconnected from the charging inlet E1. When the second connector C2 is disconnected from the charging inlet E1, the signal level of the determination signal inputted to the input port P1 returns to the original Hi level (at and after time t4 in FIG. 3). Thus the disconnection of the second connector C2 can be detected by the signal level of this determination signal.

When the second connector C2 is disconnected from the charging inlet E1 during the charge standby mode (during the temporary halt state of the charging), the routine proceeds to step S10. At step S10, in order to terminate the charging, the charging control apparatus 1 outputs command signals that bring the relay switches C42, E5 and E6 to the open state (OFF).

With this operation, since the power supplied from the external power supply BP through the power line C3 of the charging cable CC is shut off, the operator can safely disconnect the second connector C2 from the charging inlet E1.

On the other hand, despite having paused the charging after the operation button C22 is pressed at step S7 and the mode shifts to the charge standby mode at step S8, when the second connector C2 is not disconnected from the charging inlet E1 at step S9, the routine proceeds to step S11. At step S11, a judgment is made as to whether or not the operation button C22 is released (the button is switched OFF or pushed OFF).

When the operation button C22 is released at step S11, the routine returns to step S6, and the charging operation, which has been temporarily halted until then, is restarted.

With this, even if the operation button C22 is pressed, which is not driver's intention (namely that even if the driver presses the operation button by mistake), or even if the operation button C22 is pressed due to snows, by releasing the operation button C22 (by issuing a command that cancels the disconnection), the charging can be restarted without shutting down the whole system.

When the operation button C22 is not released and remains ON at step S11, the routine proceeds to step S12, and repeats steps S8, S9 and S11 until a predetermined time elapses. This predetermined time could be set in accordance with a battery charge state SOC (that indicates a capacity of charge of the battery) of the battery E2. For example, when SOC of the battery E2 is small, a short time is set as the predetermined time. When SOC of the battery E2 is large, a long time is set as the predetermined time.

In the present charging control apparatus, a charge state detection section (a charge state detection means) that detects the battery charge state SOC of the battery E2 is provided.

When the second connector C2 is not disconnected from the charging inlet E1 and the operation button C22 is not released within the predetermined time, the routine proceeds to step S14, and it is judged that a failure occurs in the operation button C22. Subsequently, the routine proceeds to step S10, and the charging control apparatus 1 outputs the command signals that bring the relay switches C42, E5 and E6 to the open state (OFF), then shuts down the system and terminates the charging operation.

As explained above, according to the present invention, in the state where the charging cable is connected to the charging inlet of the vehicle, when obtaining or detecting the command that indicates disconnection of the charging cable, the charging operation is temporarily halted while maintaining the relay switches in the closed state (ON). Further, when obtaining or detecting the command that indicates cancel of the disconnection within the predetermined time, the charging operation is restarted.

That is to say, when the operation button C22 is pressed in the state where the charging cable CC is connected to the charging inlet E1 of the vehicle, the charging operation by the AC/DC converter E4 is temporarily halted while maintaining the relay switches C42, E5 and E6 in the closed state (ON) for only the predetermined time. Then when the operation button C22 is released within the predetermined time, the charging operation is restarted.

With this control, unnecessary switching action (ON/OFF action) of the relay switches C42, E5 and E6 can be prevented, and reduction in lifetime of the relay switches can be suppressed.

Further, by setting the predetermined time of step S12 in FIG. 2 in accordance with the SOC value of the battery E2, it is possible to prevent over discharge due to power consumption in the charge standby mode at step S8.

In the above embodiment, the system is configured so that the command of disconnection of the charging cable CC from the charging inlet E1 is issued by or in response to ON/OFF of the operation button C22. However, it is not limited to a mechanical manner by the operation button. The disconnection command could be issued by an electronic or electrical manner such as remote operation using a portable terminal or a PDA (personal digital assistant) and voice command using voice recognition.

In the above description, the battery E2 corresponds to a storage unit or storage battery. The operation button C22 corresponds to a disconnection command unit (a disconnection command means). The connection judging circuit C21 and the connection state determining circuit E17 correspond to a connection state detection section (a connection state detection means) and a disconnection detection section (a disconnection detection means). The charging control apparatus 1 corresponds to a control unit (a control means).

REFERENCE SIGN LIST

EV electric motor (vehicle)
E1 charging inlet
E11~E15 terminals
E16 interface circuit E17 connection state determining circuit (connection state detection section)
E18 power supply
E2 battery
E3 LC filter
E4 AC/DC converter
E5, E6 relay switches
E7 vehicle controller
E8 power line (power supply line)
BP external power supply (power supply outside the vehicle)
CC charging cable
C1 first connector
C2 second connector
C21 connection judging circuit (connection state detection section)
C22 operation button C22
C23, C24 power terminals
C25 ground terminal
C26, C27 signal terminals
C3 power line
C4 control unit C4
C41 signal generating section
C42 relay switch
C5 ground wire
R1~R9 resistance elements
L1 control signal lines
L2 output signal line
P1, P2 input ports
SW1, SW2 switches
D1 diode
L coil
C capacitor
1 charging control apparatus (control unit)

The invention claimed is:

1. A charging control apparatus that controls a charge operation, using a charging cable that is connected to a charging inlet of a vehicle and supplies power to a storage unit of the vehicle from an external power supply provided outside the vehicle, the charging control apparatus comprising:
   a connection state detection section that detects connection of the charging cable to the charging inlet;
   a disconnection detection section that detects a command signal of a disconnection command unit of the charging cable; and
   a control unit that, when detecting the command signal of the disconnection command unit which indicates the disconnection in a state where the charging cable is connected to the charging inlet, pauses the charge operation to the storage unit while maintaining a closed state of at least a relay switch of a charging cable side power supply line for only a predetermined time,
   wherein the control unit maintains closed states of all relay switches provided on a power supply line when detecting the command signal of the disconnection command unit.

2. The charging control apparatus as claimed in claim 1, wherein the control unit restarts the charge operation to the storage unit when the disconnection detection section detects a command signal of the disconnection command unit which indicates cancel of the disconnection during the predetermined time.

3. The charging control apparatus as claimed in claim 1, wherein the control unit opens at least the relay switch of the charging cable side power supply line of all the relay switches provided on the power supply line when the disconnection of the charging cable from the charging inlet is detected by the connection state detection section during the predetermined time.

4. The charging control apparatus as claimed in claim 1, wherein the control unit opens at least the relay switch of the charging cable side power supply line of all the relay switches provided on the power supply line when the disconnection of the charging cable from the charging inlet is not detected by the connection state detection section during the predetermined time and the predetermined time elapses.

5. The charging control apparatus as claimed in claim 4, wherein: the control unit judges that a failure occurs in the disconnection command unit.

6. The charging control apparatus as claimed in claim 1, further comprising:
   a charge state detection section that detects a charge state of the storage unit, and the control unit sets the predetermined time in accordance with the charge state of the storage unit.

7. A charging control method for controlling a charge operation to a storage unit of a vehicle, using a charging cable that is connected to a charging inlet of the vehicle and supplies power to the storage unit from an external power supply provided outside the vehicle, the method comprising:
   detecting connection of the charging cable to the charging inlet;
   detecting a command signal of a disconnection command unit of the charging cable;
   pausing the charge operation to the storage unit while maintaining a closed state of at least a relay switch of a charging cable side power supply line for only a predetermined time, when detecting the command signal of the disconnection command unit which indicates the disconnection in a state where the charging cable is connected to the charging inlet;
   restarting the charge operation to the storage unit when detecting a command signal of the disconnection command unit which indicates cancel of the disconnection during the predetermined time; and
   maintaining closed states of all relay switches provided on a power supply line when detecting the command signal of the disconnection command unit.

* * * * *